(No Model.)
J. W. FLYNN.
ORNAMENTAL NAIL HEAD.
No. 354,123. Patented Dec. 14, 1886.
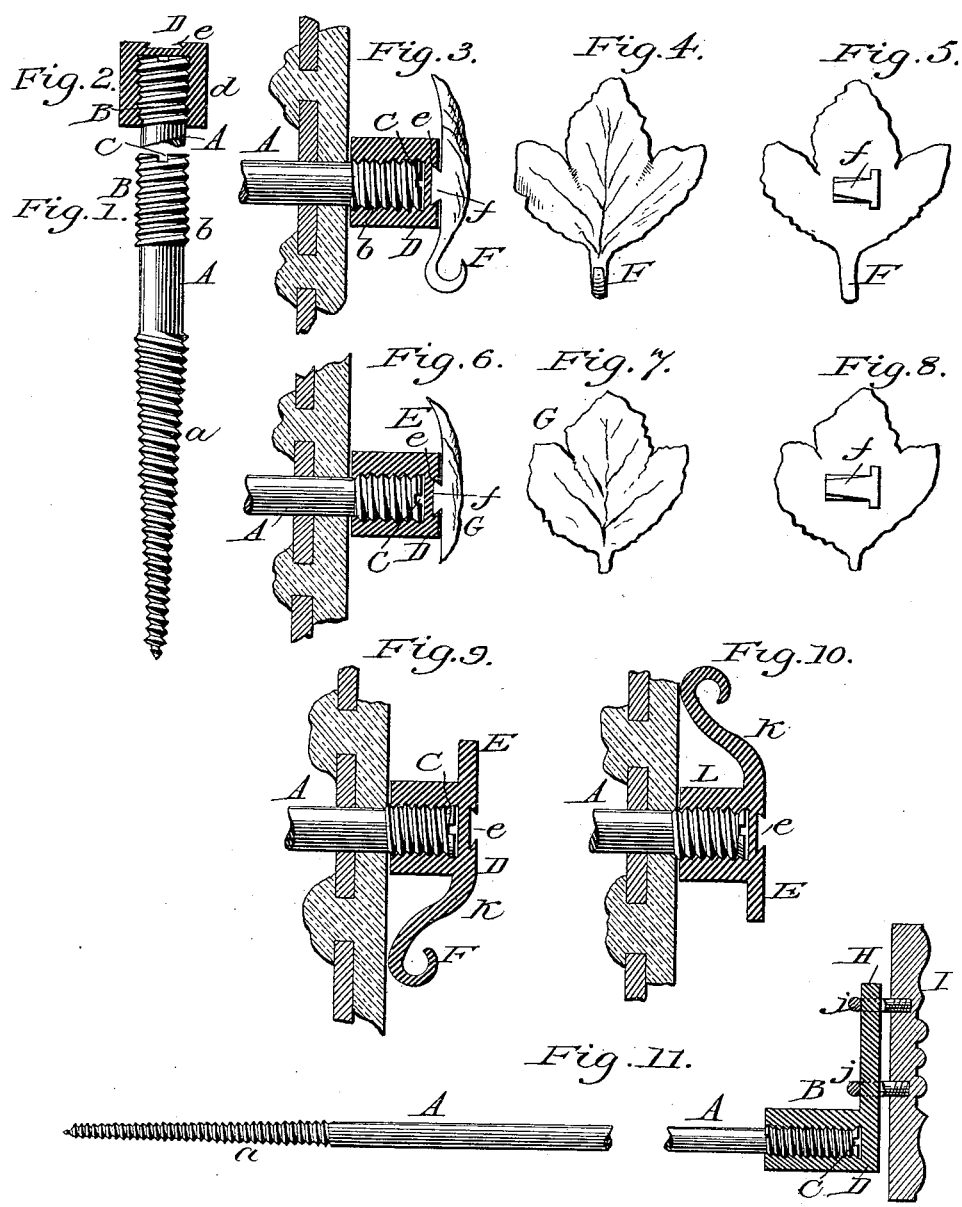

UNITED STATES PATENT OFFICE.

JAMES W. FLYNN, OF NEW YORK, N. Y.

ORNAMENTAL NAIL-HEAD.

SPECIFICATION forming part of Letters Patent No. 354,123, dated December 14, 1886.

Application filed January 8, 1886. Serial No. 188,048. (No model.)

*To all whom it may concern:*

Be it known that I, JAMES W. FLYNN, a citizen of the United States of America, residing in the city, county, and State of New York, have invented a new and useful Improvement in Wall-Screws, of which the following is a full, clear, concise, and exact description, reference being had to the accompanying drawings, wherein similar letters refer to similar parts throughout the several views.

My invention relates to providing means of suspension for pictures, engravings, brackets, curtain-fixtures, cornices, and other decorations upon interior walls, whether hung with either cords, wires, or staples.

The objects I seek to accomplish by my invention are to furnish an insertible suspensory device which can be made to penetrate lath or wood-work with the least injury to the plastering or other exterior finish of a wall; to furnish a detachable securing cap or cover on the driving end thereof for concealment of the same, or by means of which penetration may be procured, and which may also be made to serve the purpose of retaining a suspensory cord, wire, or staple, or to act as a brace for supporting the outer end, or for both purposes, as desired, and to render the whole exposed surface of the same ornamental. These objects are accomplished by my invention, which consists in a bolt of metal provided with a penetrating end for insertion and a free driving end, the driving end being also provided with a detachable securing cap or cover of a form convenient for retaining a cord or staple eye, or to serve as a brace for maintaining in horizontal position the driving end. The shank may be similar to that of a screw, and its penetrating end may either be tapered, like a nail, or tapered and threaded, like a gimlet-screw. Its driving end, so far as it is intended to be covered by the cap, is preferably of greater diameter than the rest, and is provided with threads corresponding to those in the cap, but converse in direction to those upon the tapering end. If the penetrating end is threaded, then the driving end is provided with a transverse slot for the reception of a screw-driver or a like tool for the purpose of turning the shank upon its axis and causing it to penetrate the wall; but if the penetrating end is not threaded, then the slot may be omitted and the shank forced into place in the wall by driving in the ordinary way before screwing on the cap. The threads of the driving end and of the cap may in the latter case run in either direction. The cap may be a hollow cylinder with a closed end; or it may be prolonged upward to prevent a suspension-cord slipping off the cap; or it may inclose the cord between it and the wall; or it may be prolonged downward to form a suspensory-hook; or it may be still rearwardly prolonged to rest against the wall and thus brace the outer end; or it may thus brace and also be outwardly curved to form a hook. Where it is intended to support curtain-cornices, the shank is made correspondingly long and the cap is carried upward to form a pintle, upon which staple-eyes in the cornice may be placed. The upward and downward projections or hooks may be made with any desired form of ornamentation, and thus conceal the end of the shank and cap. Such ornaments are provided with a tongue of flexible metal, which fits into a slot or groove provided in the outer end of the cover or cap to receive them and hold them in position. Preferably such slots or grooves are perpendicular and tapering downwardly. The ornaments may be struck up by dies with such tongues integral, or the tongues may be soldered on upon their back. The shanks, threads, and caps may vary in sizes, the same as ordinary screws or nails, according to the demands of the trade.

In the drawings, Figure 1 represents a shank, A, threaded, as at *a*, at its interior or entering end, like an ordinary screw-bolt, and threaded at its opposite end, B, in an opposite direction, as at *b*, and with a terminal slot, C, for the reception of a tool like a screw-driver to force it into place.

Fig. 2 represents in section the cap D secured in place upon the end B of shank A, and provided also with a tapering dovetailed groove, *e*, for the reception of the tongue *f* of any desired exterior ornament.

Figs. 3, 6, 9, and 10 show different forms of hooks or devices in place upon a section of the wall for preventing a suspensory-cord from slipping off the cap or else forming a part of the cap. In Fig. 3 the ornament F, the face and rear of which are shown in Figs. 4 and 5, terminates in a depending and suspensory hook, as well as a superior retaining device projecting upward. It may project upward alone, as in Figs. 6, 7, and 8.

Figs. 9, 10, and 11 show projections integral with the cap. In Fig. 9, K is a brace terminating in a suspensory-hook, and E is an upturned hook. In Fig. 10 these parts are shown inverted, showing space L, in which a suspensory-cord may be securely locked. Fig. 11 shows the adaptation of an upturned straight hook integral with the cap upon a bolt for the support of cornice I, provided with staple-eyes *j j*.

It is apparent that the caps may be made of any suitable shape, and that the projection, which may serve as points of suspension, may also be used for forcing a threaded bolt in a wall, in the same manner as the handle of a gimlet. When it is not threaded at its interior end, the bolt may be driven in, like a nail, before screwing on the cap.

My invention will not only be useful where no cornices or moldings exist, but where the cornice-hooks are not to be procured, or where it is desired to suspend an article intermediate the ceiling and the floor. It will be especially serviceable in running insulated wires for interior electric purposes, as the upturned upright hook E (shown in Fig. 9) may be threaded and carry an insulated cap adapted thereto.

Having described my invention, what I desire to secure by Letters Patent is—

1. A suspensory device consisting of a head-threaded bolt and screw-threaded penetrating end, a terminal slot for driving the same, a cap covering the driving end screwed thereon and provided with an exterior slot for the reception of suspensory devices, substantially as described.

2. A cap-brace consisting of a detachable cap covering the driving end of a metallic bolt and upwardly and inwardly prolonged for a brace, substantially as described.

3. A cornice-holder consisting of an entering bolt and a detachable cap thereon upwardly prolonged to form a pintle for the reception of staple-eyes, and all substantially as described.

J. W. FLYNN.

Witnesses:
 MORRIS HERRMANN,
 M. JESSE HENRY.